US012562512B2

(12) United States Patent
Gebhardt

(10) Patent No.: US 12,562,512 B2
(45) Date of Patent: Feb. 24, 2026

(54) CONNECTION ASSEMBLY, CONNECTION CLAMP AND ELECTRONIC DEVICE

(71) Applicant: Phoenix Contact GmbH & Co.KG, Blomberg (DE)

(72) Inventor: Martin Gebhardt, Lage (DE)

(73) Assignee: PHOENIX CONTACT GMBH & CO. KG, Blomberg (DE)

( * ) Notice: Subject to any disclaimer, the term of this patent is extended or adjusted under 35 U.S.C. 154(b) by 293 days.

(21) Appl. No.: 18/262,923

(22) PCT Filed: Jan. 21, 2022

(86) PCT No.: PCT/EP2022/051307

§ 371 (c)(1),
(2) Date: Jul. 26, 2023

(87) PCT Pub. No.: WO2022/161860

PCT Pub. Date: Aug. 4, 2022

(65) Prior Publication Data

US 2025/0273879 A1 Aug. 28, 2025

(30) Foreign Application Priority Data

Jan. 29, 2021 (BE) .................................. 2021/5070

(51) Int. Cl.
*H01R 4/48* (2006.01)

(52) U.S. Cl.
CPC ......... *H01R 4/4833* (2023.08); *H01R 4/4835* (2023.08); *H01R 4/4821* (2023.08)

(58) Field of Classification Search
None
See application file for complete search history.

(56) References Cited

U.S. PATENT DOCUMENTS

| | | | | |
|---|---|---|---|---|
| 10,658,766 | B2 * | 5/2020 | Herrmann ............ | H01R 4/4833 |
| 2007/0099479 | A1 * | 5/2007 | Holterhoff ........... | H01R 4/4835 439/441 |
| 2018/0248276 | A1 | 8/2018 | Kettern | |
| 2022/0190493 | A1 | 6/2022 | Fehling et al. | |

FOREIGN PATENT DOCUMENTS

| | | | | |
|---|---|---|---|---|
| DE | 102015115612 A1 | 3/2017 | | |
| DE | 102019111453 A1 | 11/2020 | | |
| WO | WO-2019174982 A1 * | 9/2019 | ........... | H01R 4/4833 |

* cited by examiner

*Primary Examiner* — Tho D Ta
(74) *Attorney, Agent, or Firm* — LEYDIG, VOIT & MAYER, LTD.

(57) ABSTRACT

A connection assembly for connecting an electrical conductor includes: a current bar; a clamping spring having a holding leg and a clamping leg, the electrical conductor being clampable against the current bar by the clamping leg in a clamped position of the clamping spring; and an actuating element guidable along an actuation direction and by which the clamping spring is transferrable from the clamped position into an open position. The actuating element is braced with the clamping spring in the open position and holds the clamping spring in the open position.

19 Claims, 5 Drawing Sheets

CONNECTION ASSEMBLY, CONNECTION CLAMP AND ELECTRONIC DEVICE

CROSS-REFERENCE TO PRIOR APPLICATIONS

This application is a U.S. National Phase application under 35 U.S.C. § 371 of International Application No. PCT/EP2022/051307, filed on Jan. 21, 2022, and claims benefit to Belgian Patent Application No. BE 2021/5070, filed on Jan. 29, 2021. The International Application was published in German on Aug. 4, 2022 as WO/2022/161860 under PCT Article 21(2).

FIELD

The invention relates to a connection assembly for connecting an electrical conductor, which assembly has a current bar, a clamping spring, which has a holding leg and a clamping leg, wherein the conductor to be connected is clamped against the current bar by means of the clamping leg in a clamped position of the clamping spring, and which assembly has an actuating element. The invention further relates to a connection clamp and an electronic device.

BACKGROUND

Such connection assemblies usually have a clamping spring designed as a leg spring, which clamping spring has a holding leg and a clamping leg, wherein a conductor inserted into the connection assembly can be clamped against the current bar by means of the clamping leg of the clamping spring. If, in particular, flexible conductors are clamped, the clamping spring must already be moved, before insertion of the conductor, into an open position by means of an actuating element and thus be actuated in order to pivot the clamping spring or the clamping leg away from the current bar so that the conductor can be inserted into the intermediate space designed as a conductor connection space between the current bar and the clamping spring. Only in the case of rigid and thus robust conductors can the conductor apply sufficient force to the clamping spring or the clamping leg of the clamping spring to be able to pivot the clamping leg away from the current bar without the actuating element having to be actuated for this purpose by a user. With flexible conductors, the user must first pivot the clamping spring away from the current bar by actuating the actuating element so that the flexible conductor can be inserted. Here, the actuating element usually presses against the clamping leg of the clamping spring in order to pivot the clamping leg away from the current bar and release the conductor connection space. The actuating element is then usually held manually in this open position until the flexible conductor is inserted into the connection space and can be clamped against the current bar.

SUMMARY

IN AN EMBODIMENT, THE PRESENT INVENTION PROVIDES A CONNECTION ASSEMBLY FOR CONNECTING AN ELECTRICAL CONDUCTOR, COMPRISING: A CURRENT BAR; A CLAMPING SPRING COMPRISING A HOLDING LEG AND A CLAMPING LEG, THE ELECTRICAL CONDUCTOR BEING CLAMPABLE AGAINST THE CURRENT BAR BY THE CLAMPING LEG IN A CLAMPED POSITION OF THE CLAMPING SPRING; AND AN ACTUATING ELEMENT GUIDABLE ALONG AN ACTUATION DIRECTION AND BY WHICH THE CLAMPING SPRING IS TRANSFERRABLE FROM THE CLAMPED POSITION INTO AN OPEN POSITION, WHEREIN THE ACTUATING ELEMENT IS BRACED WITH THE CLAMPING SPRING IN THE OPEN POSITION AND HOLDS THE CLAMPING SPRING IN THE OPEN POSITION.

BRIEF DESCRIPTION OF THE DRAWINGS

The present invention will be described in even greater detail below based on the exemplary figures. The invention is not limited to the exemplary embodiments. Other features and advantages of various embodiments of the present invention will become apparent by reading the following detailed description with reference to the attached drawings which illustrate the following.

DETAILED DESCRIPTION

Figure 1:
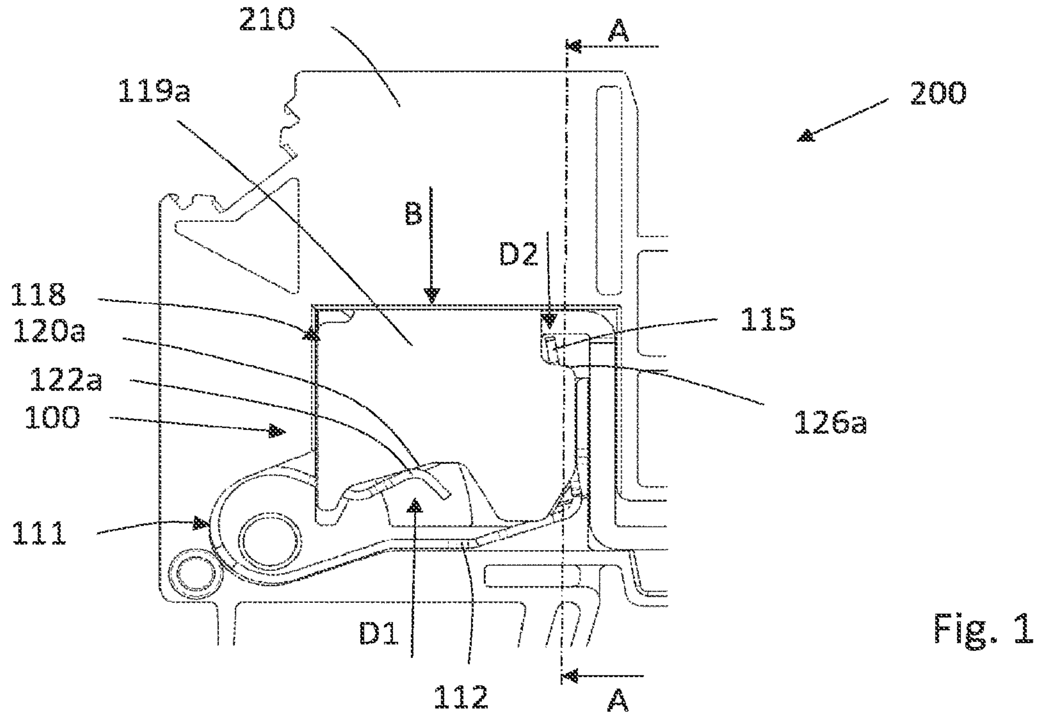
FIG. 1 shows a schematic representation of a connection clamp according to the invention in an open position of the clamping spring.

In an embodiment, the present invention provides a connection assembly as well as a connection clamp and an electronic device, with which handling while conductors, in particular flexible conductors, are being connected can be simplified for a user.

The connection assembly according to the invention is characterized in that the actuating element is braced with the clamping spring in the open position and holds the clamping spring in the open position.

Due to the braced arrangement of the actuating element with the clamping spring in the open position of the clamping spring, the actuating element can be held automatically in this position in order to hold the clamping spring in the open position. The actuating element and the clamping spring support one another in the open position. The actuating element and the clamping spring can thus form a self-contained force system in the open position of the clamping spring so that, in the open position of the clamping spring, the actuating element can be held in a fixed position relative to the clamping spring by the force of the clamping spring, without the actuating element having to be held manually or by means of a tool in this position. This enables simpler, in particular one-handed operation of the connection assembly by a user in order to be able to connect a conductor, in particular a flexible conductor, simply and securely. As a result of the braced arrangement in the open position of the clamped position, the clamping spring and actuating element hold one another in the desired position and prevent a movement relative to one another.

In order to form the bracing, the clamping spring, in the open position, can apply a first pressure force acting counter to the actuation direction of the actuating element and a second pressure force acting in the actuation direction of the actuating element to the actuating element. By means of these two oppositely acting pressure forces applied by the clamping spring, the actuating element can be held in the open position solely by the force of the clamping spring. Both the first pressure force and the second pressure force are applied by the clamping spring to the actuating element so that in the open position, the actuating element can be clamped between the clamping spring or subportions of the clamping spring and held in a stationary manner by these two oppositely acting pressure forces.

According to the invention, the clamping spring can be designed in such a way that a latching leg can be arranged on the holding leg and can apply the second pressure force to the actuating element in the open position. The second pressure force is then preferably precisely not applied to the actuating element by the clamping leg or the holding leg of the clamping spring, but the clamping spring can have a third leg, the latching leg, by means of which the second pressure force can be applied to the actuating element. The latching leg can be arranged on the holding leg at an end of the holding leg remote from the clamping leg. The holding leg can thus be arranged between the clamping leg and the latching leg. The latching leg can be formed integrally with the holding leg or be connected as a separate part to the latching leg, in particular connected to the latching leg in a form-fitting and/or force-fitting manner.

The latching leg is preferably connected resiliently to the holding leg or is formed with the holding leg so that the latching leg can be pivotable relative to the holding leg.

In order to enable, in particular, a tool-free connection of conductors with a small conductor cross-section, in particular of flexible conductors, the latching leg can have a pressure surface, wherein, for transferring the clamping spring from the open position into the clamped position, the pressure surface can be actuated by the conductor to be connected and can be brought out of engagement with the actuating element by actuating the pressure surface of the latching legs. The latching leg can have a pressure surface which can be arranged flush with an insertion region of the conductor into the connection assembly and thus in extension of a conductor insertion opening of a housing of a connection clamp so that the conductor abuts against the pressure surface of the latching element during insertion into the connection assembly. By applying a pressure force to the pressure surface by means of the conductor, the latching leg can be put into a pivoting movement or tilting movement in the direction of the conductor insertion direction so that the latching leg can be pivoted or tilted away from the actuating element in the conductor insertion direction. As a result of the pivoting movement of the latching leg, the latching leg can be brought out of engagement with the actuating element and can thus be released from the actuating element so that the actuating element and thus the clamping spring can be transferred from the open position into the clamped position without manual assistance. By means of this special mechanism, a conductor, in particular a conductor with a small conductor cross-section and/or a flexible conductor can be connected in a particularly simple manner solely by the insertion movement of the conductor, without a user having to actuate further elements, such as the actuating element, on the connection assembly in order to release the clamping spring and move it from the clamped position into the open position. This facilitates the handling of the connection assembly and saves time when connecting a conductor. The bracing of the actuating element with the clamping spring in the open position of the clamping spring can thus be released or canceled by the conductor to be connected.

In order to hold the latching leg on the actuating element in the open position of the clamping spring, the actuating element can have a holding contour. The holding contour enables a secure and defined holding of the latching leg on the actuating element in the open position of the clamping spring. In the region of the holding contour, the latching leg can apply the second pressure force on the actuating element in the open position of the clamping spring. The holding contour is preferably formed in the form of a special surface shaping on the actuating element itself.

The holding contour can have a first surface and a second surface arranged at an angle to the first surface. The first surface and the second surface are preferably each formed on an edge surface of the actuating element. An angle $\alpha$ can be spanned between the first surface and the second surface. The angle $\alpha$ can preferably be between 30° and 130°.

For example, the first surface can be arranged at an obtuse angle to the second surface. The angle $\alpha$ between the first surface and the second surface is then preferably $93° \leq \alpha \leq 120°$, preferably $95° \leq \alpha \leq 110°$. The obtuse angle makes it possible, in particular, for the latching leg to slide smoothly onto the holding contour of the actuating element when the clamping leg is transferred from the clamped position into the open position in order to brace the latching leg or the clamping spring with the actuating element.

Furthermore, it is possible for the first surface to be arranged at a 90° angle to the second surface. The two surfaces of the holding contour are then oriented at a right angle to one another. The formation of the two surfaces at an angle of $\alpha=90°$ enables secure seating of the latching leg on the holding contour, in particular on the first surface of the holding contour, in the open position of the clamping spring.

In order to be able to further stabilize the positioning of the latching leg on the holding contour in the open position of the clamping spring, the first surface can be arranged at an acute angle to the second surface. The angle $\alpha$ between the two surfaces is then preferably $85° \leq \alpha \leq 45°$, preferably $80° \leq \alpha \leq 60°$. Due to the acute-angled arrangement of the two surfaces of the holding contour, the latching leg held on the holding contour can slide further in the direction of the connection point between the first surface and the second surface so that the latching leg can be reliably prevented from slipping off the holding contour, in particular from the first surface of the holding contour.

Furthermore or alternatively, it is possible for an elevation to be formed on the first surface of the holding contour. The elevation can be formed, for example, in the form of a hump or a projection on the first surface. In the open position of the clamping spring, the latching leg can be held behind the elevation so that undesired slipping or release of the latching leg from the actuating element can be prevented Furthermore or alternatively, it is also possible for a depression, in particular a channel or notch, to be formed on the first surface. In the open position of the clamping spring, the latching leg can latch onto this depression or channel or notch so that undesired slipping or release of the latching leg from the actuating element can be prevented.

The actuating element can have a U-shaped cross-section. The actuating element can have a first actuating arm and a second actuating arm arranged at a distance from the first actuating arm, wherein the holding contour can then be formed on the first actuating arm and on the second actuating arm. The two actuating arms are preferably oriented parallel to one another. Between the two actuating arms, a free space is formed into which the conductor to be connected is inserted and through which the conductor to be connected can be guided in the direction of the latching leg. The conductor connection space formed between the current bar and the clamping spring can be laterally delimited by the first actuating arm and the second actuating arm so that the two actuating arms can guide the conductor to be connected and prevent it from yielding laterally. The holding contour on the first actuating arm is preferably formed symmetrically to the holding contour arranged on the second actuating arm. In the open position of the clamping spring, the latching leg can be held, in particular latched, on the two actuating arms or on the two holding contours of the two actuating arms. At its free end, the latching leg can have a T-shaped shape, with which the latching leg can be held on the two actuating arms. As a result of the T-shape, the latching leg can have a first laterally projecting holding arm and a second laterally projecting holding arm, wherein the first holding arm can hold the latching leg on the holding contour of the first actuating arm and the second holding arm can hold the latching leg on the holding contour of the second actuating arm.

In the open position, the first pressure force can be applied to the actuating element by means of the clamping leg of the clamping spring, wherein the clamping leg can have a clamping tab and at least one side tab arranged laterally of the clamping tab, wherein a clamping edge for clamping the conductor to be connected against the current bar in the clamped position can be formed on a free end of the clamping tab and the first pressure force can be applied to the actuating element by means of the at least one side tab in the open position. The clamping leg itself can thus apply the first pressure force, which can act counter to the actuation direction of the actuating element, to the actuating element. If the latching leg is released from the bracing or latching with the actuating element, only the first pressure force applied by the clamping leg still acts on the actuating element so that the clamping spring or the clamping leg can then automatically pivot from the open position into the clamped position as a result of this pressure force of the clamping leg in that the clamping leg can press the actuating element upward counter to the actuation direction. The clamping leg is preferably divided into a clamping tab and at least one, preferably two side tabs which can be formed laterally of the clamping tab. In the case of two side tabs, the clamping tab is arranged between the two side tabs. The two side tabs are preferably in direct contact with the actuating element so that the first pressure force can be applied to the actuating element via these two side tabs. The clamping tab is preferably not in direct contact with the actuating element, but the clamping tab is used solely to clamp the conductor against the current bar in the clamped position. The at least one side tab is preferably curved so that it can form a runner which can slide along an edge surface of the actuating element during the transfer into the open position and into the clamped position.

The connection assembly is preferably designed in such a way that the actuation direction of the actuating element can be formed transversely to a conductor insertion direction of the conductor to be connected into a conductor connection space formed between the current bar and the clamping spring.

In an embodiment, the invention provides a connection clamp, in particular a terminal block, which has a housing and at least one connection assembly arranged in the housing and formed and developed as described above. A conductor insertion opening can be formed on the housing, is formed flush with the conductor connection space of the connection assembly, and the conductor to be connected can be inserted via it into the housing and into the connection assembly. In particular in the case of a design as a terminal block which can be latched onto a support rail, two such connection assemblies can also be arranged in the housing.

In an embodiment, the invention provides an electronic device, which has at least one connection assembly formed and developed as described above and/or at least one connection clamp formed and developed as described above. The electronic device can, for example, be a switch cabinet, in which one or more support rails or mounting plates can be arranged, onto which a plurality of connection clamps, in particular terminal blocks, which have corresponding connection assemblies, can be latched.

FIG. 1 shows a connection clamp 200 with a housing 210, within which a connection assembly 100 for connecting a conductor 300 is arranged. The housing 210 is preferably formed from an insulating material, for example a plastic material. The connection assembly 100 is arranged in an interior of the housing 210.

Figure 3:
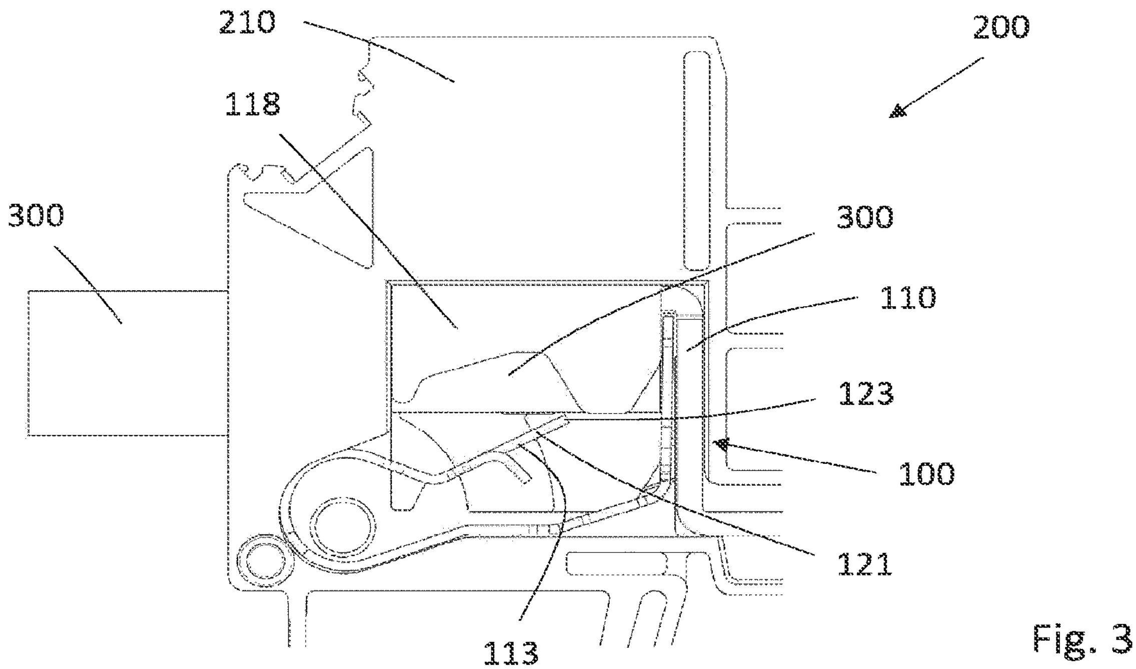
FIG. 3 shows a schematic representation of the connection clamp in a clamped position of the clamping spring.
Figure 4:
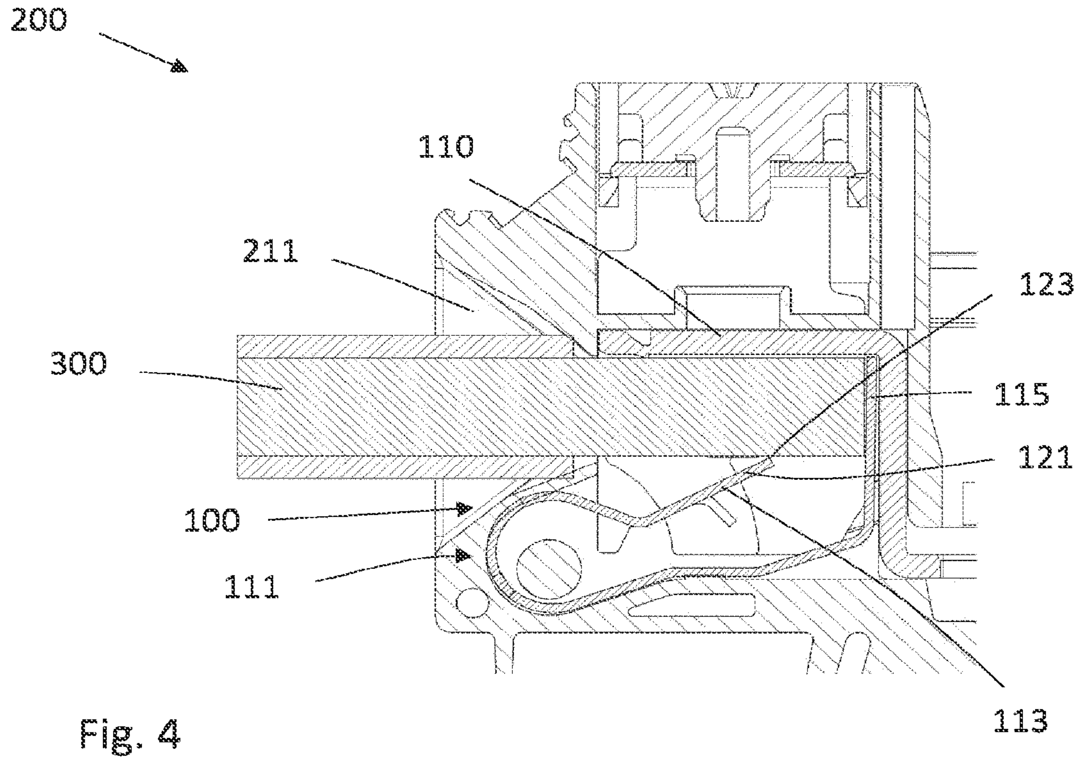
FIG. 4 shows a schematic sectional representation of the connection clamp shown in FIG. 3, with the clamping spring in the clamped position.

The connection assembly 100 has a current bar 110 and a clamping spring 111, wherein the conductor 300 to be connected can be electrically conductively clamped against the current bar 110 by means of the clamping spring 111, as shown in FIGS. 3 and 4.

Figure 2:
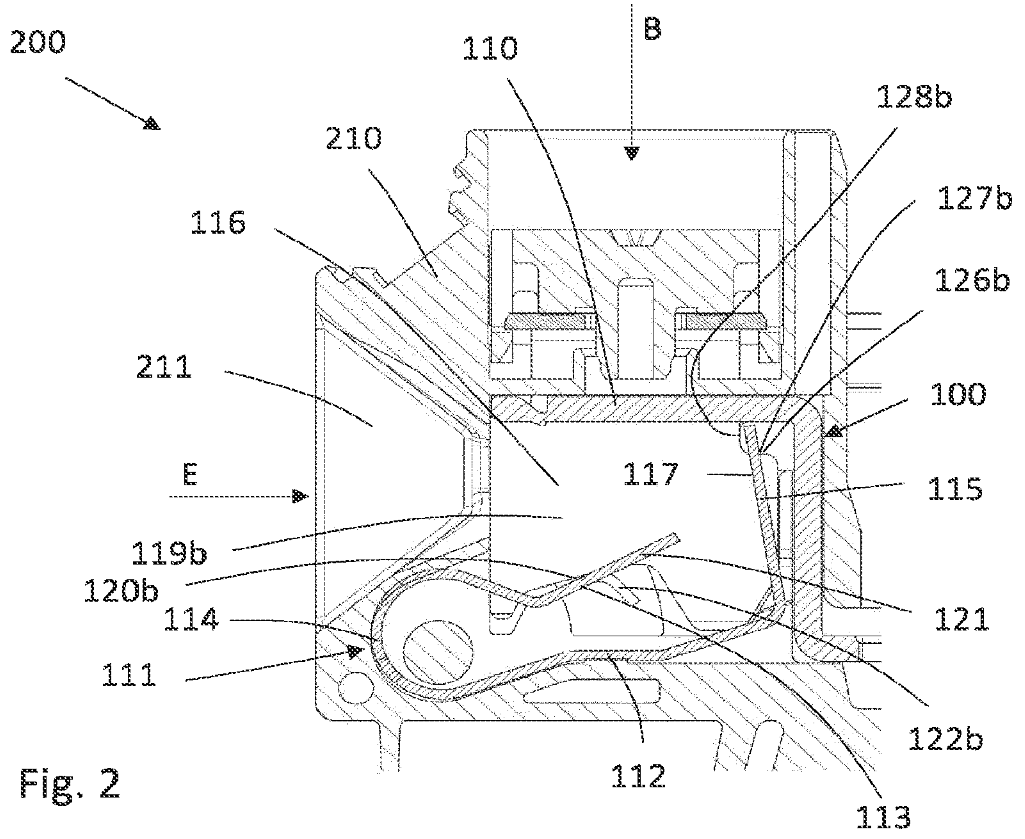
FIG. 2 shows a schematic sectional representation of the connection clamp shown in FIG. 1, with the clamping spring in an open position.

The clamping spring 111 is designed as a leg spring. The clamping spring 111 has a holding leg 112 and a clamping leg 113. The holding leg 112 and the clamping leg 113 are connected to one another via an arcuate portion 114. The holding leg 112 is arranged in the housing 110 in a fixed position. The clamping leg 113 is pivotable relative to the holding leg 112 so that, depending on the position of the clamping leg 113, the clamping spring 111 can be transferred and positioned in an open position, as shown in FIGS. 1 and 2, and in a clamped position, as shown in FIGS. 3 and 4.

The clamping spring 111 also has a latching leg 115 so that the clamping spring 111 has three legs. The latching leg 115 is connected to the holding leg 112 so that the holding leg 112 is arranged between the clamping leg 113 and the latching leg 113. In the embodiment shown here, the latching leg 115 extends substantially at a right angle away from the holding leg 112. The latching leg 115 is designed so long that it projects starting from the holding leg 112 beyond the clamping leg 113, at least in the open position of the clamping spring 111. The latching leg 115 serves to help hold the clamping spring 111 in the open position.

The latching leg 115 extends starting from the holding leg 112 in the direction of the conductor connection space 116, which is formed between the current bar 110 and the clamping spring 111, wherein the conductor 300 to be connected is inserted into this conductor connection space 116 in order to connect the conductor 300 and clamp it against the current bar 110. The latching leg 115 is designed so long that it delimits the conductor connection space 116 in the conductor insertion direction E. If a conductor 300 is inserted into the conductor connection space 116 via a conductor insertion opening 211 formed on the housing 210, the conductor 300 abuts against the latching leg 115, as a result of which the latching leg 115 can be deflected or pivoted in the conductor insertion direction E. The latching leg 115 has a pressure surface 117 which points in the direction of the conductor connection space 116 and against which the conductor 300 can abut during insertion into the conductor connection space 116. So that the latching leg 115 can be deflected, the latching leg 115 is connected resiliently to the holding leg 112.

In order to transfer the clamping spring 111 from the clamped position into the open position, the connection assembly 100 furthermore has an actuating element 118. The actuating element 118 is guided purely linearly in the housing 210. When the clamping spring 111 is actuated in order to transfer it from the clamped position into the open position, the actuating element 118 is moved in the actuation direction B, in which the actuating element 118 is moved in the direction of the clamping spring 111. The actuating element 118 interacts with the clamping leg 113 of the clamping spring 111 in that the actuating element 118 exerts a force in the actuation direction B on the clamping leg 113 so that the latter is pivoted in the direction of the holding leg 112 in order to release the conductor connection space 116.

In the embodiment shown here, the actuating element 118 has a U-shaped cross-section. The actuating element 118 has two actuating arms 119*a*, 119*b* extending parallel to one another. Between the two actuating arms 119*a*, 119*b* is formed a free space, through which the conductor 300 to be connected can be guided. The two actuating arms 119*a*, 119*b* are designed so long that they laterally delimit the conductor connection space 116 and thus can form a lateral guide for the conductor 300 to be connected.

An actuating surface 120*a*, 120*b*, which interacts with the clamping spring 111 for actuating the clamping spring 111, is formed on the edge surfaces, pointing in the direction of the clamping spring 113, of the actuating arms 119*a*, 119*b*. With its two actuating surfaces 120*a*, 120*b*, the actuating element 118 rests on the clamping leg 113 of the clamping spring 111 when said clamping leg is transferred from the clamped position into the open position.

The clamping leg 113 has a clamping tab 121 and two side tabs 122*a*, 122*b* arranged laterally to the clamping tab 121. At its free end, the clamping tab 121 has a clamping edge 123, by means of which the conductor 300 to be connected is clamped against the current bar 110.

The clamping tab 121 is arranged between the two side tabs 122*a*, 122*b*. The clamping tab 121 is longer than the two side tabs 122*a*, 122*b* so that the clamping tab 121 extends beyond the two side tabs 122*a*, 122*b*. The two side tabs 122*a*, 122*b* each have an arcuate shape. The two side tabs 122*a*, 122*b* can thus each form a runner which can slide along the actuating surfaces 120*a*, 120*b* when interacting with the actuating element 118. For actuating the clamping spring 121, the actuating element 118 is thus in direct contact with the two side tabs 122*a*, 122*b* of the clamping spring 111, whereas the clamping tab 121 does not have direct contact with the actuating element 118. The clamping tab 121 is arranged in the free space formed between the two actuating arms 119*a*, 119*b*.

FIGS. 1 and 2 show the clamping spring 111 in the open position in which the conductor connection space 116 is released so that a conductor 300 to be connected can be inserted into the latter and also guided out of it again. In this open position, the clamping spring 111 and the actuating element 118 are braced with one another so that the clamping spring 111 and the actuating element 118 form a closed force system, in which the actuating element 118 is held in position by the clamping spring 111 without additional auxiliary means and the clamping spring 111 is in turn held in position by the actuating element 118.

The actuating element 118 is braced with the clamping spring 111 in that, in the open position, the clamping spring 111 applies two oppositely acting pressure forces D1, D2 to the actuating element 118. As a result of these two oppositely acting pressure forces D1, D2, the actuating element 118 and thus also the clamping spring 111 can be held in a stable, stationary position.

The first pressure force D1 acts on the actuating element 118 counter to the actuation direction B. The first pressure force D1 is applied to the actuating element 118 by the clamping leg 113, in particular by the side tabs 122*a*, 122*b* of the clamping leg 113. In the process, the side tabs 122*a*, 122*b* press on the actuating surfaces 120*a*, 120*b* of the actuating element 118 with the first pressure force D1 applied by the spring effect of the clamping leg 113.

Figure 10:
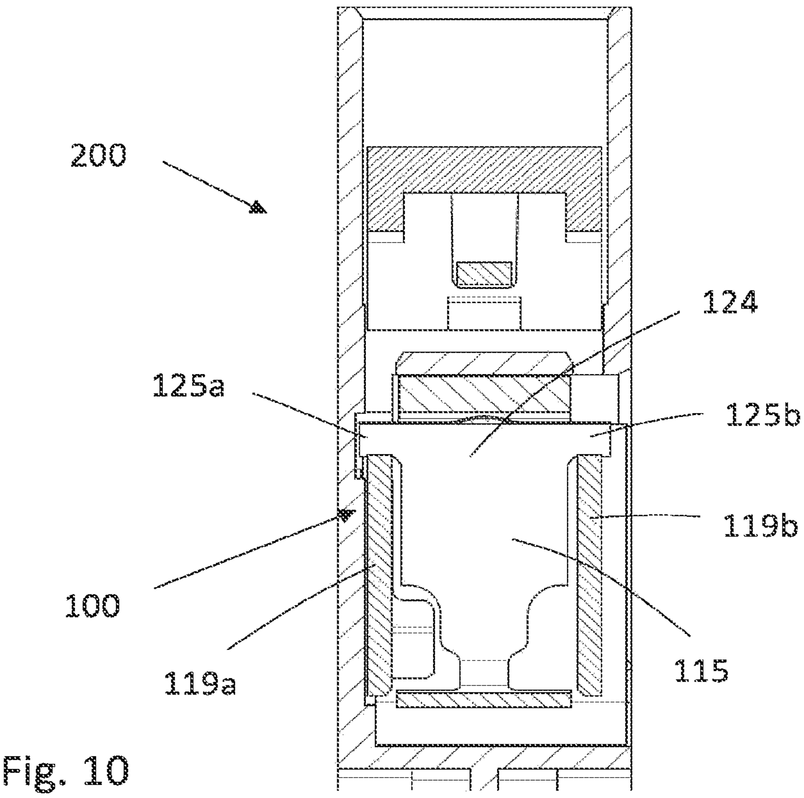
FIG. 10 shows a schematic sectional representation of the connection clamp along line A-A drawn in in FIG. 1.

The second pressure force D2 acts on the actuating element 118 in the actuation direction B. The second pressure force D2 is applied by the latching leg 115 of the clamping spring 111 to the actuating element 118. The latching leg 115 is held with its free end 124 on the actuating element 118, in particular on the two actuating arms 119*a*, 119*b* of the actuating element 118, in particular latched on the actuating element 118. As can be seen in the sectional representation of FIG. 10, the free end 124 has a T-shape in that the free end 124 has two laterally outward projecting holding arms 125*a*, 125*b*. In the open position, the latching leg 115 is held with its first holding arm 125*a* on the first actuating arm 119*a* and held with its second holding arm 125*b* on the second actuating arm 119*b*.

In order to be able to ensure a positionally secure and thus defined holding of the latching leg 115 on the actuating element 118 in the open position, a holding contour 126*a*, 126*b* is formed on each of the two actuating arms 119*a*, 119*b*. The holding contour 126*a*, 126*b* is formed at a distance from the actuating surfaces 120*a*, 120*b* on the actuating element 118. In the open position, the two holding arms 125*a*, 125*b* of the latching leg 115 rest against the holding contour 126*a*, 126*b* of the actuating arms 119*a*, 119*b* in order to hold the latching leg 115 in a stationary position.

The holding contour 126*a*, 126*b* can have different shapes. FIGS. 5 to 9 show possible shapes of the holding contour 126*a*, 126*b*.

The holding contour 126*a*, 126*b* each has a first surface 127*a*, 127*b* and a second surface 128*a*, 128*b* arranged at an angle to the first surface 127*a*, 127*b*. The two surfaces 127*a*, 127*b*, 128*a*, 128*b* are aligned with one another at an angle α.

Figure 5:
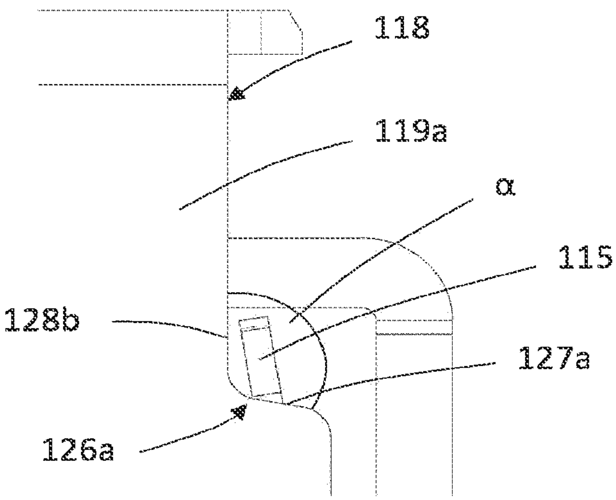
FIG. 5 shows a schematic representation of the holding contour with an obtuse angle.

In the embodiment shown in FIG. 5, the angle α between the two surfaces 127*a*, 127*b*, 128*a*, 128*b* is >90°. The first surface 127*a*, 127*b* is thus formed at an obtuse angle to the second surface 128*a*, 128*b*. In the embodiment shown here, the angle α is approximately 100°.

Figure 6:
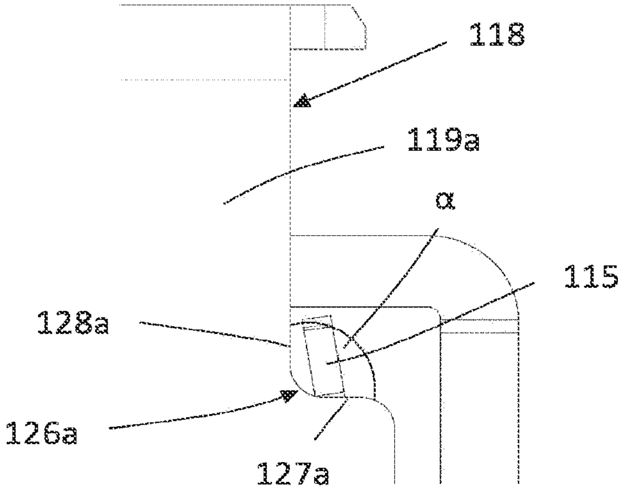
FIG. 6 shows a schematic representation of the holding contour with a 90° angle.

In the embodiment shown in FIG. 6, the first surface 127*a*, 127*b* is formed at a right angle to the second surface 128*a*, 128*b* so that the angle α=90°.

Figure 7:
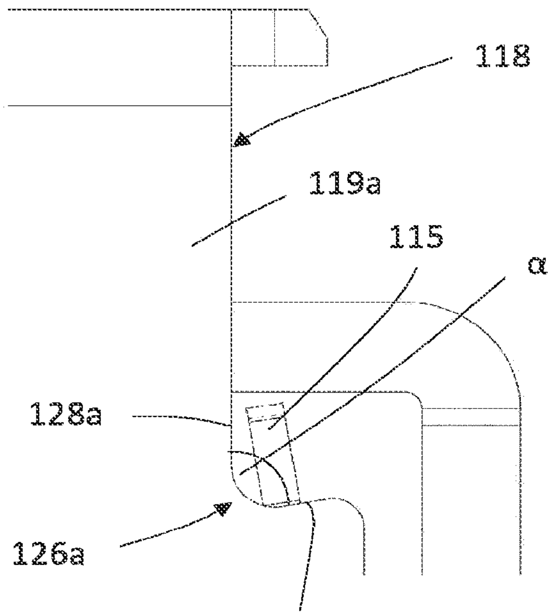
FIG. 7 shows a schematic representation of the holding contour with an acute angle.

In the embodiment shown in FIG. 7, the angle α between the two surfaces 127*a*, 127*b*, 128*a*, 128*b* is <90°. The first surface 127*a*, 127*b* is thus formed at an acute angle to the second surface 128*a*, 128*b*. In the embodiment shown here, the angle α is approximately 85°.

Figure 8:
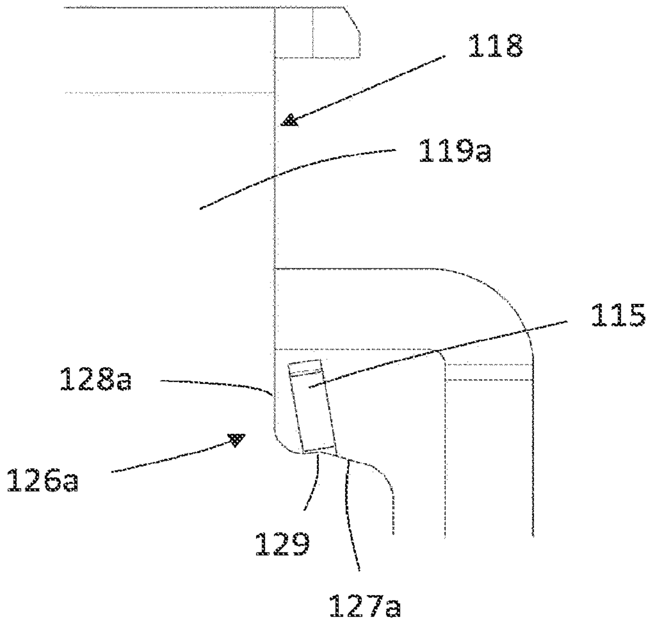
FIG. 8 shows a schematic representation of the holding contour with an elevation.

FIG. 8 shows an embodiment in which the first surface 127*a*, 127*b* is formed at an obtuse angle to the second surface 128*a*, 128*b* and, in addition, an elevation 129 in the form of a hump or projection is formed on the first surface 127*a*, 127*b*.

Figure 9:
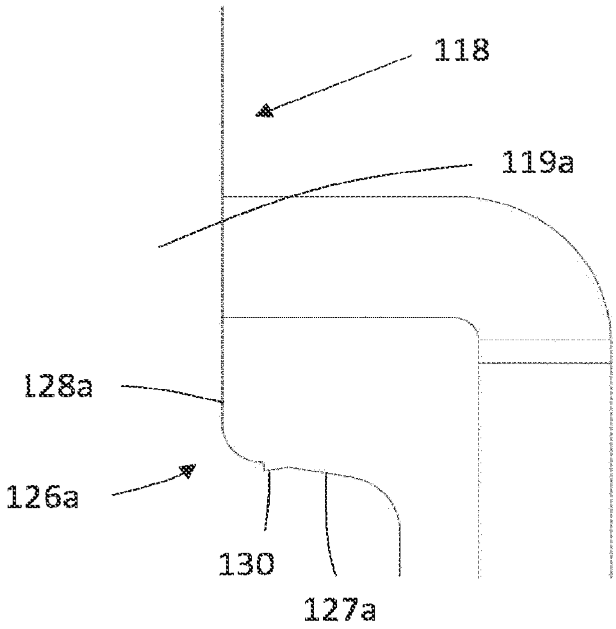
FIG. 9 shows a schematic representation of the holding contour with a channel.

FIG. 9 shows an embodiment in which the first surface 127*a*, 127*b* is likewise formed at an obtuse angle to the second surface 128*a*, 128*b* and, in addition, a channel 130 in the form of a depression is formed on the first surface 127*a*, 127*b*.

FIGS. 1 to 4 show the actuating element 118 with a holding contour 126*a*, 126*b* designed as in FIG. 5.

If, in the open position of the clamping spring 111, a conductor 300 to be connected is inserted into the conductor connection space 116 via the conductor insertion opening 211 of the housing 210 in the conductor insertion direction E, the conductor 300 abuts against the pressure surface 117, arranged flush with the conductor insertion opening 211, of the latching leg 115 of the clamping spring 111. By the conductor 300 abutting against the pressure surface 117, the latching leg 115 is pivoted in the conductor insertion direction E so that the latching leg 115 is brought out of engagement with the holding contour 126*a*, 126*b* of the actuating element 118.

As soon as the latching leg 115 is released from the actuating element 118, the bracing of the clamping spring 111 with the actuating element 118 is released since the latching leg 115 no longer exerts a second pressure force D2 on the actuating element 118. Thus, only the first pressure force D1 applied by the clamping leg 113 to the actuating element 118 acts on the actuating element 118, as a result of which the clamping leg 113 can displace the actuating element 118 upward counter to the actuation direction B by the spring force of the clamping leg 113, as a result of which the clamping leg 113 also moves in the direction of the conductor 300 inserted into the conductor connection space 116 in order to press said conductor against the current bar 110 via the clamping tab 121 of the clamping leg 113 and thus clamp and connect the conductor 300 against the current bar 110. This clamped position of the clamping spring 111 is shown in FIGS. 3 and 4.

This makes it possible to connect and clamp a conductor 300, in particular a conductor 300 with a small conductor cross-section, without additional assistance.

Here, the conductor 300 is inserted transversely to the actuation direction B of the actuating element 118 into the conductor connection space 116 and thus into the connection assembly 100 or into the connection clamp 200.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS

100 Connection assembly
110 Current bar
111 Clamping spring
112 Holding leg
113 Clamping leg
114 Arcuate portion
115 Latching leg
116 Conductor connection space
117 Pressure surface
118 Actuating element
119*a*, 119*b* Actuating arm
120*a*, 120*b* Actuating surface
121 Clamping tab
122*a*, 122*b* Side tab
123 Clamping edge
124 Free end
125*a*, 125*b* Holding arm
126*a*, 126*b* Holding contour
127*a*, 127*b* First surface
128*a*, 128*b* Second surface
129 Elevation
130 Channel
200 Clamp terminal
210 Housing
211 Conductor insertion opening
300 Conductor
D1 First pressure force
D2 Second pressure force
B Actuation direction
E Conductor insertion direction α Angle

The invention claimed is:

1. A connection assembly for connecting an electrical conductor, comprising:

a current bar;

a clamping spring comprising a holding leg and a clamping leg, the electrical conductor being clampable against the current bar by the clamping leg in a clamped position of the clamping spring; and an actuating element guidable along an actuation direction and by which the clamping spring is transferrable from the clamped position into an open position, wherein the actuating element is braced with the clamping spring in the open position and holds the clamping spring in the open position, and wherein, to brace the actuating element, the clamping spring, in the open position, is configured to apply a first pressure force acting counter to the actuation direction of the actuating element and a second pressure force acting in the actuation direction of the actuating element to the actuating element.

2. The connection assembly of claim 1, wherein the actuating element has a first actuating arm and a second actuating arm arranged at a distance from the first actuating arm, and wherein the holding contour is formed on the first actuating arm and on the second actuating arm.

3. The connection assembly of claim 1, wherein, in the open position, the first pressure force is applied to the actuating element by the clamping leg of the clamping spring, wherein the clamping leg has a clamping tab and at least one side tab arranged laterally to the clamping tab, wherein a clamping edge configured to clamp the electrical conductor against the current bar in the clamped position is formed on a free end of the clamping tab and the first pressure force is applied to the actuating element by the at least one side tab in the open position.

4. The connection assembly of claim 1, wherein the actuation direction of the actuating element is formed transversely to a conductor insertion direction of the electrical conductor into a conductor connection space formed between the current bar and the clamping spring.

5. An electronic device, comprising:

at least one connection assembly of claim 1.

6. The connection assembly of claim 1, wherein a latching leg is arranged on the holding leg and is configured to apply the second pressure force to the actuating element in the open position.

7. The connection assembly of claim 6, wherein the latching leg has a pressure surface, and wherein, to transfer the clamping spring from the open position into the clamped position, the pressure surface is actuatable by the electrical conductor and is disengageable from the actuating element by actuating the pressure surface of the latching legs.

8. The connection assembly of claim 7, wherein a holding contour configured to hold the latching leg on the actuating element in the open position of the clamping spring is formed on the actuating element.

9. The connection assembly of claim 8, wherein the holding contour has a first surface and a second surface arranged at an angle to the first surface.

10. The connection assembly of claim 9, wherein the first surface is arranged at an obtuse angle to the second surface.

11. The connection assembly of claim 9, wherein the first surface is arranged at a 90° angle to the second surface.

12. The connection assembly of claim 9, wherein the first surface is arranged at an acute angle to the second surface.

13. The connection assembly of claim 9, wherein an elevation is formed on the first surface.

14. The connection assembly of claim 9, wherein a channel is formed on the first surface.

15. A connection clamp, comprising:

a housing; and at least one connection assembly of claim 1 arranged in the housing.

16. The connection clamp of claim 15, wherein the connection clamp comprises a terminal block.

17. An electronic device, comprising:

at least one connection clamp of claim 15.

18. A connection assembly for connecting an electrical conductor, comprising:

a current bar;

a clamping spring comprising a holding leg and a clamping leg, the electrical conductor being clampable against the current bar by the clamping leg in a clamped position of the clamping spring; and an actuating element guidable along an actuation direction and by which the clamping spring is transferrable from the clamped position into an open position, wherein the actuating element is braced with the clamping spring in the open position and holds the clamping spring in the open position, wherein the actuating element has a first actuating arm and a second actuating arm arranged at a distance from the first actuating arm, and wherein the holding contour is formed on the first actuating arm and on the second actuating arm.

19. A connection assembly for connecting an electrical conductor, comprising:

a current bar;

a clamping spring comprising a holding leg and a clamping leg, the electrical conductor being clampable against the current bar by the clamping leg in a clamped position of the clamping spring; and an actuating element guidable along an actuation direction and by which the clamping spring is transferrable from the clamped position into an open position, wherein the actuating element is braced with the clamping spring in the open position and holds the clamping spring in the open position, and wherein the actuation direction of the actuating element is formed transversely to a conductor insertion direction of the electrical conductor into a conductor connection space formed between the current bar and the clamping spring.

* * * * *